United States Patent [19]

Scheu

[11] Patent Number: 4,513,298

[45] Date of Patent: Apr. 23, 1985

[54] THERMAL INK JET PRINTHEAD

[75] Inventor: Friedrich Scheu, Vancouver, Wash.

[73] Assignee: Hewlett-Packard Company, Palo Alto, Calif.

[21] Appl. No.: 497,774

[22] Filed: May 25, 1983

[51] Int. Cl.[3] .............................................. G01D 15/18

[52] U.S. Cl. .............................................. 346/140 R

[58] Field of Search .............................................. 346/140

[56] References Cited

U.S. PATENT DOCUMENTS

| | | | |
|---|---|---|---|
| 4,335,389 | 6/1982 | Shirato | 346/140 |
| 4,429,321 | 1/1984 | Matsumoto | 346/140 |
| 4,438,191 | 3/1984 | Cloutier | 346/140 X |

*Primary Examiner*—Joseph W. Hartary

*Attorney, Agent, or Firm*—William H. MacAllister; F. David LaRiviere

[57] ABSTRACT

A protective passivation structure is provided for a thermal ink jet printing head which employs a resistive heating element formed of phosphorus-diffused silicon. The passivation structure includes a layer of silicon nitride over the heating element with a layer of silicon carbide over the silicon nitride layer. The nitride exhibits good adhesion to the underlying silicon as well as good thermal conductivity. The carbide has exceptionally good wear and hardness qualities against ink bubble cavitation as well as adhering well to the nitride.

3 Claims, 2 Drawing Figures

THERMAL INK JET PRINTHEAD

BACKGROUND OF THE INVENTION

The rapidity of modern-day date processing imposes severe demands on the ability to produce a printout record at very high speed. Impact printing, in which permanently shaped character elements physically contact a recording medium, are proving to be too slow and too bulky for many applications. Thus, the industry has turned to other alternatives involving non-impact printing schemes using various techniques to cause a desired character to be formed on the recording medium. Some of these involve the use of electrostatic or magnetic fields to control the deposition of a visible characterforming substance, either solid (i.e., dry powder) or liquid (i.e., ink) on the medium which is usually paper. Other systems utilize electrophotographic or ionic systems in which an electron or ion beam impinges on the medium and causes a change in coloration at the point of impingement. Still another system employs a thermal image to achieve the desired shape coloration change. Of more recent import is a printing technique, called ink jet printing, in which tiny droplets of ink are electronically caused to impinge on a recording medium to form any selected character at any location at very high speed. Ink jet printing is a non-contact system which requires no specially treated recording media, ordinary plain paper being suitable, and which requires no vacuum equipment or bulky mechanisms. The present invention relates to this kind of printing system.

Ink jet systems may be classified as follows: (1) continuous, in which ink droplets are continuously spewed out from a nozzle at a constant rate under constant ink pressure; (2) electrostatic, in which an electrically charged ink jet is impelled by controllable electrostatic fields; and (3) impulse, or ink-on-demand, in which ink droplets are impelled on demand from a nozzle by mechanical force or thermal energy. The invention is concerned with a nozzle head for this latter type of system.

Typical of the ink-on-demand system is the approach set forth in U.S. Pat. No. 3,832,579 entitled PULSED DROPLET EJECTING SYSTEM. Here a cylindrical piezoelectric transducer is tightly bound to the outer surface of a cylindrical nozzle. Ink is delivered to the nozzle by means of a hose connected between one end of the nozzle and an ink reservoir. As the piezoelectric transducer receives an electrical impulse, it squeezes the nozzle which in turn generates a pressure wave resulting in the acceleration of the ink toward both ends of the nozzle. An ink droplet is formed when the ink pressure wave exceeds the surface tension of the meniscus at the orifice on the small end of the nozzle.

Another type of ink-on-demand printing is described in U.S. Pat. No. 3,179,042 entitled SUDDEN STEAM PRINTER. This system utilizes a number of ink-containing tubes, electric current being passed through the ink itself. Because of the high resistance of the ink, it is heated so that a portion thereof is vaporized in the tubes causing ink and ink vapor to be expelled from the tubes.

In a cop-pending application, Ser. No. 412,290 filed Sept. 7, 1982 and entitled THERMAL INK JET PRINTER by John L. Vaught et al., and assigned to the instant assignee, an ink-on-demand printing system is described which utilizes an ink-containing capillary having an orifice from which ink is ejected. Located closely adjacent to this orifice is an ink-heating element which may be a resistor located either within or adjacent to the capillary. Upon the application of a suitable current to the resistor, it is rapidly heated. A significant amount of thermal energy is transferred to the ink resulting in vaporization of a small portion of the ink adjacent the orifice and producing a bubble in the capillary. The formation of this bubble in turn creates a pressure wave which propels a single ink droplet from the orifice onto a nearby writing surface or recording medium. By properly selecting the location of the ink-heating element with respect to the orifice and with careful control of the energy transfer from the heating element to the ink, the ink bubble will quickly collapse on or near the ink-heating element before any vapor escapes from the orifice.

It will be appreciated that the lifetime of such thermal ink jet printers is dependent, among other things, upon resistor lifetime. It has been found that a majority of resistor failures is due to cavitation damage which occurs during bubble collapse. Hence it is desirable that resistor wear due to cavitation damage should be minimized as much as possible. In co-pending application Ser. No. 443,711 entitled THERMAL INK JET PRINTER UTILIZING A PRINTHEAD RESISTOR HAVING A CENTRAL COLD SPOT, filed Nov. 22, 1982 by John D. Meyer and assigned to the instant assignee, the resistive element is provided with a central "cold" spot formed of a conductive material, it being assumed that most of the bubble damage occurs at or near the center of the resistor. The cold spot causes the formation of a toroidal bubble which upon collapse is randomly distributed across the resistor surface instead of being concentrated in a small central area of the resistor.

In another co-pending application Ser. No. 449,820 entitled THERMAL INK JET PRINTER UTILIZING SECONDARY INK VAPORIZATION, filed on Dec. 15, 1982 by John D. Meyer and assigned to the instant assignee, still another solution to reducing resistor wear is described. Here the resistive layer is covered with a passivation layer to provide chemical and mechanical protection during operation. The passivation layer in this application may be a thin layer of such materials as silicon carbide, silicon oxide, or aluminum oxide. In co-pending application Ser. No. 443,972 entitled MONOLITHIC INK JET ORIFICE PLATE/RESISTOR COMBINATION filed by Frank L. Cloutier, et al., and assigned to the instant assignee, it is suggested that the passivating or protective layer may be formed of such materials as silicon oxynitride, aluminum oxide or titanium dioxide as well as silicon dioxide. In both of these latter two proposals it will be noted that the protective or passivation layer is formed of a single layer of one distinct material. While these materials, particularly silicon carbide, have been satisfactory as far as their wear properties are concerned, they have one weakness, namely, poor adherence to the underlying metallization.

SUMMARY OF THE INVENTION

The present invention provides a passivation layer comprising two distinct layers formed of two distinct materials one of which is silicon carbide. The silicon carbide layer is the uppermost of the two and is the one in contact with the ink and on which the ink bubble collapses. The silicon carbide layer covers an underlying layer which is silicon nitride or oxynitride. The total passivation structure is designed to meet the following criteria: chemical inertness and freedom from pinholes: good thermal conductivity; compatibility with other materials; sufficient film hardness to resist cavitation and accoustic shock damage; electrically non-conductive; exhibiting minimum roughness; and possessing good adherence to the underlying metallization. Silicon nitride or oxynitride have been found to have good adherence to materials constituting the resistive and/or conductive elements of the ink jet print head. In addition, it may be deposited forming an exceptionally smooth surface; it is electrically non-conductive; it is compatible with other materials; it does have good thermal conductivity; and it is chemically inert. Finally, silicon carbide, which exhibits the desired hardness to protect the underlying structure from cavitation damage as well as the other criteria recited above, has been found to adhere well to the underlying silicon nitride or oxynitride layer.

DETAILED DESCRIPTION OF THE INVENTION

Figure 1:
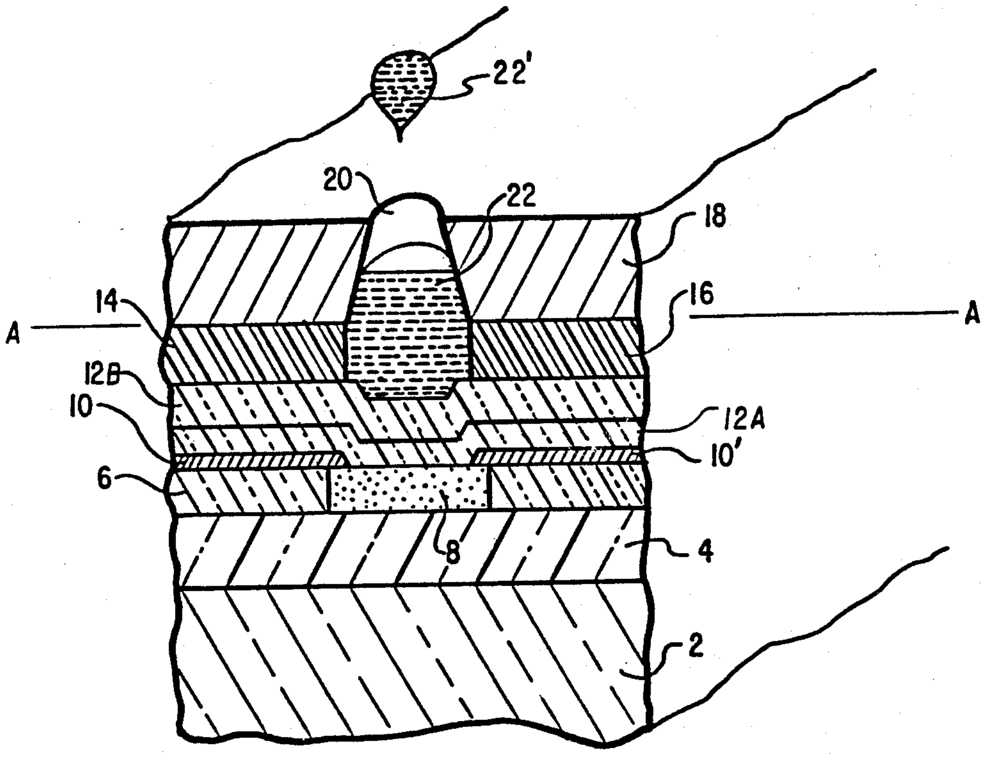
FIG. 1 is a perspective view, partly in section, of a portion of an ink jet print head showing one orifice and the underlying structure associated therewith and embodying the present invention.

Referring now to the drawings and to the FIG. 1, in particular, there is shown a portion of the printhead embodying a single orifice and the structure associated therewith. The principal support structure is a substrate 2 of single crystalline silicon on the upper surface of which is formed a thermally insulating layer 4 of silicon dioxide which may typically be 3.5 microns in thickness. Next, a layer 6 of polycrystalline silicon is deposited over the layer 4 of silicon dioxide. Typically, the polycrystalline silicon layer 6 may be from 4,000 to 5,000 angstroms in thickness. Formed in or on the upper surface of the polycrystalline silicon layer 6 by the diffusion of phosphorus therein is a resistive element 8. The formation of the resistive element 8 will be described in greater detail herein after. Likewise, disposed on the polycrystalline silicon layer 6 are conductor elements or strips, 10 and 10', which may be of aluminum or of an alloy of aluminum and coper. The conductors 10, 10' make contact to oppose ends of the resistive element 8. The next structure disposed over the resistive element 8 and its associated conductors 10 and 10' is a dual passivation layer 12A, 12B. The layer 12A, in immediate contact with the resistive element 8 and the conductors 10, 10' is a nitride of silicon and may be from 2,000 to 3,000 angstroms in thickness. (As used herein and in the appended claims the phrase "nitride of silicon" includes both silicon nitride and silicon oxynitride.) Over the layer 12A of the nitride of silicon is a layer 12B of silicon carbide which may be from 0.5 to 2.5 microns in thickness. It has been found that the nitride of silicon layer 12A adheres very well to the underlying layer 6 of polycrystalline silicon as well as to the resistive element 8 and its associated conductors 10 and 10'.

Figure 2:
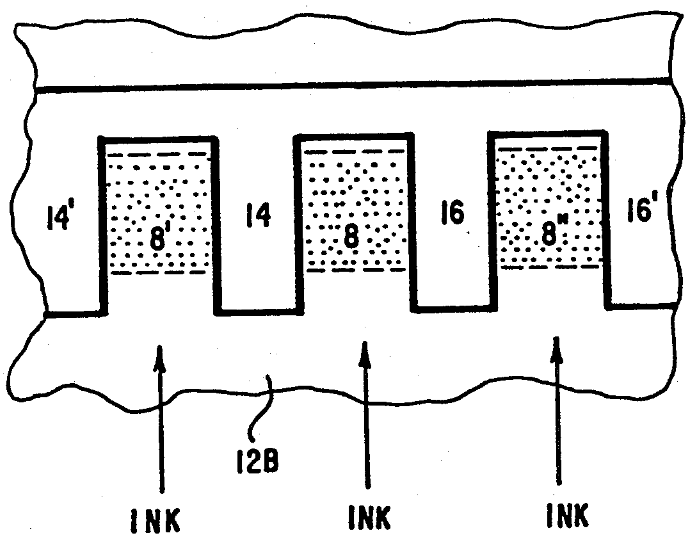
FIG. 2 is a plan view of a plurality of resistor-barrier structures as if taken along the Line A—A of FIG. 1 and extended.

Formed on the upper surface of the silicon carbide layer 12B are barrier elements 14 and 16 which may comprise an organic plastic material such as RISTON or VACREL. These barriers may take various configurations. As shown in FIG. 1, they are formed on each side of the underlying resistor element 8. As shown in FIG. 2, these barrier structures may surround each resistive element on three sides. The barriers 14 and 16 serve to control refilling and collapse of the bubble, prevent spattering from an adjacent orifice, as well as minimizing cross-talk between adjacent resistors. The particular materials RISTON and VACREL are organic polymers manufactured and sold by E. I. DuPont de Nemours and Company of Wilmington, Del. These materials have been found to possess good adhesive qualities for holding the orifice plate 18 in position on the upper surface of the printhead assembly. In addition, both materials can withstand temperatures as high as 300 degrees centrigrade. The orifice plate 18 may be formed of nickel. As shown, the orifice 20 itself is disposed immediately above and in line with its associated resistive element. While only a single orifice has been shown, it will be understood that a complete printhead system may comprise an array of orifices each having a respective underlying resistive element and conductors to permit the selective ejection of a droplet of ink from any particular orifice. In practice, there may be as many as 256 orifices in a single array. With particular reference to FIG. 2, it will be appreciated that the barriers 14 and 16 serve to space the orifice plate 22 above the passivation layer 12B permitting ink to flow in this space and between the barriers so as to be available in each orifice and over and above respective resistive elements 8, 8' and 8''.

Upon energization of the resistive element 8, the thermal energy developed thereby is transmitted through the passivation layers 12A and 12B to heat and vaporize a portion of the ink 22 disposed in the orifice 20 and immediately above the resistive element 8. The vaporization of the ink 22 eventually results in the expulsion of a droplet 22' of ink which impinges upon an immediately adjacent recording medium (not shown). The bubble of ink formed during the heating and vaporization thereof then collapses back onto the area immediately above the resistive element 8. The resistor 8 is, however, now protected from any deleterious effects due to collapse of the ink bubble by means of the composite passivation layers 12A, 12B. The silicon carbide layer 12B, being the layer in immediately contact with the ink, provides protection to the underlying layers due to its extreme hardness and resistance to cavitation.

In fabricating the printhead structure according to the invention, it will be appreciated that the particular geometry of any particular element or layer may be achieved by techniques well known in the art of film deposition and formation. These techniques involve the utilization of photo-resists and etching procedures to expose desired areas of the layer or structure where an element is to be formed followed by the deposition of the material of which the particular element is to be formed. The particular processes for forming the various layers and elements of the printhead assembly, according to the invention, will be described in the order in which these fabrication processes are followed in the construction of the device. The deposition processes operate in the pressure range of about 2 torr or less.

The thermal insulating barrier 4 of silicon dioxide may be formed by either of two techniques. The layer may be a deposited film of silicon dioxide or it may be a grown layer. The grown form of silicon dioxide is accomplished by heating the silicon substrate itself in an oxidizing atmosphere according to techniques well known in the art of semi-conductor silicon processing. The deposited form of silicon dioxide is accomplished by heating the silicon substrate 2 in a mixture of silane, oxygen, and argon at a temperature of from 300 to 400 degrees C. until the desired thickness of silicon dioxide has been deposited.

The polycrystalline layer 6 may be formed by the plasma enhanced chemical vapor deposition of silicon by the decomposition of a silicon compound such as silane diluted by argon. A typical temperature to achieve this decomposition and deposition is 500 to 600 degrees centrigrade, for example, and a typical deposition rate is about one micron per minute.

The resistive element 8 may be formed by the diffusion of phosphorus into the polycrystalline silicon layer 6 using oxide masking and diffusion techniques well known in the art of semiconductor doping.

The conductive elements 10, 10' may be formed of aluminum or of aluminum and copper. These materials may be either sputtered on to the surface of the polycrystalline silicon layer 6 or they may be vapor deposited thereon utilzing a mask technique which permits the deposition to extend only over edge portions of the underlying resistive element or layer 8. It is also possible by vapor deposition to lay down a continuous layer of aluminum and then by the aforementioned photo resist and etching procedures, remove a portion or portions of the deposited aluminum from over the resistive element, leaving the structure as shown in the drawing.

The silicon nitride layer 12A is formed by the plasma enhanced chemical vapor deposition of silicon nitride from the decomposition of silane mixed with ammonia at a pressure of about 2 torr and at a temperature of from 300 to 400 degrees centigrade. The oxynitride may be formed by using a mixture of silane, nitrous oxide, and oxygen at a pressure of about 1.1 torr and at a temperature of from 300 to 400 degrees centigrade. The silicon carbide layer 12B is deposited by using silane and methane in a range of temperatures from 300 to 450 degrees centigrade.

There thus has been described an improved thermal ink jet print head having a passivation structure which is characterized by superior resistance to damage by collapse and/or cavitation of ink bubbles and which passivation structure exhibits excellent adherence to the underlying elements of the print head which it protects.

What is claimed is:

1. In a thermal ink jet printhead assembly comprising a print head support member, an orifice plate having an orifice therein, means for supporting said orifice plate on said support member, and heating means formed of phosphorus diffused silicon disposed between said orifice plate and said support member and adjacent said orifice, the improvement comprising: a layer of a nitride of silicon disposed at least on said heating means, and a layer of silicon carbide disposed on said layer of said nitride of silicon.

2. A thermal ink jet printhead comprising: a substrate member of silicon, a thermally insulating layer of silicon dioxide on said substrate member, resistive means formed of phosphorusdiffused silicon disposed on said thermally insulating layer, electrical connection members disposed on said thermally insulating layer and in electrical contact with said resistive heating means, a layer of a nitride of silicon disposed at least on said heating means, a layer of silicon carbide disposed on said layer of said nitride of silicon, barrier members mounted on said layer of silicon carbide and adjacent at least two sides of said heating means, an orifice plate mounted on said barrier members and having an orifice therein disposed adjacent to and aligned with said heating means.

3. The invention according to claim 2 wherein said resistive heating means is formed of polycrystalline silicon.

* * * * *